US 9,260,153 B2

(12) United States Patent
Theobald

(10) Patent No.: US 9,260,153 B2
(45) Date of Patent: Feb. 16, 2016

(54) VEHICLE IN PARTICULAR A MOTORCYCLE AND ENGINE/GEARBOX UNIT FOR A VEHICLE

(75) Inventor: Markus Theobald, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 825 days.

(21) Appl. No.: 11/976,619

(22) Filed: Oct. 25, 2007

(65) Prior Publication Data
US 2008/0223644 A1   Sep. 18, 2008

Related U.S. Application Data

(63) Continuation of application No. PCT/EP2006/006478, filed on Jul. 4, 2006.

(30) Foreign Application Priority Data

Jul. 14, 2005  (EP) .................................... 05015290

(51) Int. Cl.
| B62M 11/00 | (2006.01) |
| B62K 11/04 | (2006.01) |
| B62M 7/02 | (2006.01) |
| B62K 25/28 | (2006.01) |

(52) U.S. Cl.
CPC ............... *B62K 11/04* (2013.01); *B62K 25/283* (2013.01); *B62M 7/02* (2013.01); *B62M 11/00* (2013.01)

(58) Field of Classification Search
CPC ................................ B62M 7/02; B62M 11/00
USPC ............. 280/230; 180/230; 475/201; 74/325, 74/332, 333, 401, 403
See application file for complete search history.

(56) References Cited

U.S. PATENT DOCUMENTS

| 4,132,281 A |   | 1/1979 | Gaddi |
| 4,165,728 A |   | 8/1979 | Matsumoto et al. |
| 4,258,587 A | * | 3/1981 | Morino ......................... 475/200 |
| 4,265,330 A |   | 5/1981 | Silk et al. |
| 4,520,688 A | * | 6/1985 | Ban .............................. 74/572.1 |
| 4,603,754 A |   | 8/1986 | Matsutoh et al. |

(Continued)

FOREIGN PATENT DOCUMENTS

| DE | 195 05 800 A1 | 8/1996 |
| DE | 198 03 016 A1 | 8/1998 |

(Continued)

OTHER PUBLICATIONS

Notification of the Fifth Office Action dated Jun. 2, 2010 (Four pages).

(Continued)

*Primary Examiner* — Joseph Rocca
*Assistant Examiner* — Daniel Yeagley
(74) *Attorney, Agent, or Firm* — Crowell & Moring LLP

(57) ABSTRACT

A vehicle, in particular a motorcycle, having an engine with a crankshaft extending transversely to a travel or longitudinal direction of the vehicle, a transmission, and a clutch, which may assume an open state and a closed state. The clutch, which allows a torque transmission from the crankshaft to the transmission in the closed state, is situated coaxially to the crankshaft. The engine and transmission may be arranged such that the vehicle's rearswing arm may be located coaxially with an axis of a transmission output shaft.

15 Claims, 15 Drawing Sheets

(56) References Cited

U.S. PATENT DOCUMENTS

| | | | |
|---|---|---|---|
| 4,619,630 A * | 10/1986 | Hattori | 474/72 |
| 4,704,920 A * | 11/1987 | Kurata | 74/665 GC |
| 4,719,819 A * | 1/1988 | Tsutsumikoshi et al. | 74/745 |
| 4,744,579 A * | 5/1988 | Roatta | 280/275 |
| 5,348,112 A | 9/1994 | Vaillancourt | |
| 5,495,833 A * | 3/1996 | Ishizaka et al. | 123/179.25 |
| 5,690,201 A | 11/1997 | Gassmann | |
| 5,860,892 A | 1/1999 | Korenjak et al. | |
| 6,213,239 B1 | 4/2001 | Onishi et al. | |
| 6,315,096 B1 | 11/2001 | Dairokuno et al. | |
| 6,325,190 B1 * | 12/2001 | Yoshimoto et al. | 192/3.21 |
| 6,381,957 B1 | 5/2002 | Horl et al. | |
| 6,397,964 B1 | 6/2002 | Yamauchi | |
| 6,487,855 B1 * | 12/2002 | Yoshimoto et al. | 60/365 |
| 6,755,272 B2 | 6/2004 | Friesen | |
| 7,104,375 B2 * | 9/2006 | Czysz | 192/48.92 |
| 2002/0062703 A1* | 5/2002 | Arakawa | 74/337.5 |
| 2002/0063004 A1 | 5/2002 | Nagasaka | |
| 2003/0106733 A1 | 6/2003 | Keller et al. | |
| 2004/0124031 A1 | 7/2004 | Tanabe et al. | |
| 2004/0206599 A1 | 10/2004 | Hegerath | |
| 2005/0020407 A1 | 1/2005 | Tanaka | |
| 2006/0289269 A1 | 12/2006 | Tiesler | |

FOREIGN PATENT DOCUMENTS

| | | | |
|---|---|---|---|
| DE | 103 33 431 A1 | | 2/2005 |
| EP | 0 290 705 A1 | | 11/1988 |
| EP | 0 592 655 B1 | | 4/1994 |
| EP | 0 725 004 B1 | | 8/1996 |
| EP | 0 780 591 B1 | | 6/1997 |
| EP | 0 926 053 B1 | | 6/1999 |
| EP | 1 081 033 B1 | | 3/2001 |
| EP | 1 195 537 B1 | | 4/2002 |
| EP | 1 245 423 A2 | | 10/2002 |
| EP | 1 302 700 A2 | | 4/2003 |
| EP | 1 382 876 B1 | | 1/2004 |
| FR | 1038140 | | 9/1953 |
| FR | 2 370 625 | | 6/1978 |
| FR | 2 738 544 A1 | | 3/1997 |
| GB | 229782 | | 3/1925 |
| GB | 558387 | | 1/1944 |
| GB | 1084453 A | * | 9/1967 |
| GB | 1 567 774 | | 5/1980 |
| GB | 2 069 949 A | | 9/1981 |
| GB | 1 600 934 | | 10/1981 |
| GB | 2 220 595 A | | 1/1990 |
| JP | 2005076867 A | * | 3/2005 |
| WO | WO 02/094649 A1 | | 11/2002 |

OTHER PUBLICATIONS

Notification of the Third Office Action issued by the People's Republic of China dated Oct. 30, 2009.
Notification of the Fourth Office Action issued by the People's Republic of China dated Mar. 9, 2010.
Notification of the First Office Action issued by the People's Republic of China dated Jan. 16, 2009.
Notification of the Second Office Action issued by the People's Republic of China dated Jul. 3, 2009.
International Search Report dated Jan. 2, 2007 with an English translation of the pertinent portions (Eleven pages).
European Office Action dated May 23, 2006 (Five pages).
European Search Report dated Jun. 27, 2007 with an English translation of the pertinent portions (Thirteen pages).
European Search Report dated Feb. 27, 2006 with an English translation of the pertinent portions (Nine pages).
Chinese Office Action dated Aug. 1, 2012 (two pages).
English Translation of Notification for the Opinion of Examination mailed Mar. 3, 2011 and Search Report.

* cited by examiner

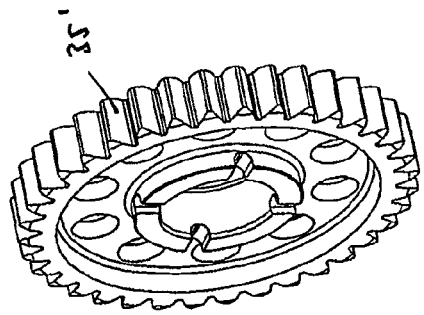
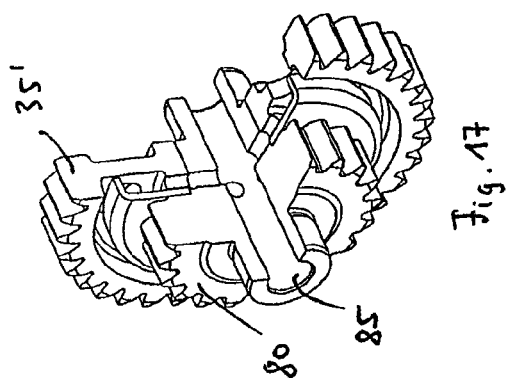
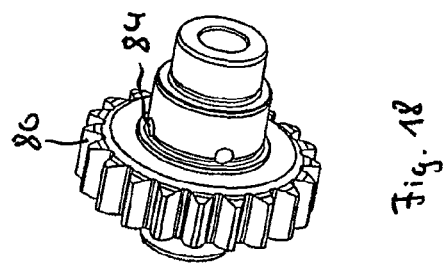
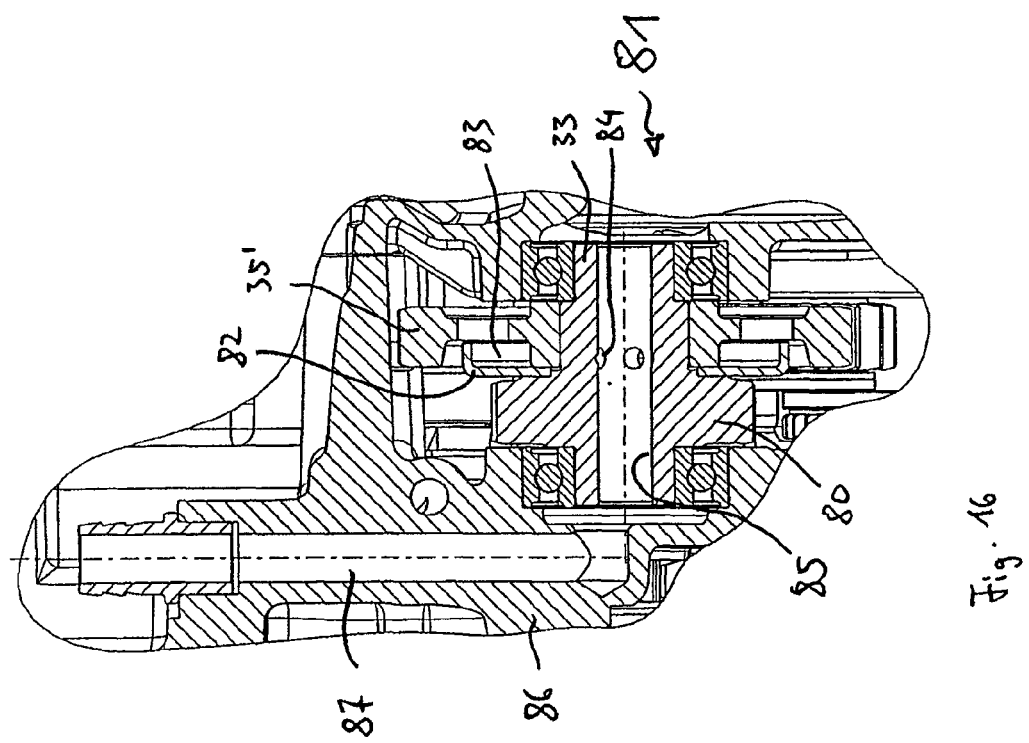

VEHICLE IN PARTICULAR A MOTORCYCLE AND ENGINE/GEARBOX UNIT FOR A VEHICLE

This application is a Continuation of PCT/EP2006/006478, filed Jul. 4, 2006, and claims the priority of DE 05015290.9, filed Jul. 14, 2005, the disclosures of which are expressly incorporated by reference herein.

BACKGROUND AND SUMMARY OF THE INVENTION

In typical motorcycles having a chain or belt drive, the pinion, which drives the chain or the drive belt, is typically situated at least approximately 65 mm offset in relation to the axis to which the rear wheel swing arm is linked. The clutch is commonly situated on the transmission input shaft in typical motorcycles. Seen in a side view of the motorcycle, the clutch thus "overlaps" the transmission output shaft. In the following, the transmission output shaft is understood as the shaft on which the pinion is situated, which drives the chain or the belt, which in turn drives the rear wheel. The transmission output shaft is typically located in front of the swing arm axis.

Typical motorcycle concepts of this type have a whole array of disadvantages. Because of the offset between the chain pinion and the swing arm axis, a certain chain sag is necessary. In particular for off-road motorcycles, which have a spring range of 150 mm or more, a significant chain sag is required. In a motorcycle having a spring range of 300 mm, for example, a chain sag of approximately 70 mm is required.

A greater chain sag results in relatively strong friction losses and requires a special chain guide. Greater chain wear also results with a large chain sag. A further result of the large chain sag may be strong running noises due to "chain whipping." "Encapsulation" of the chain is constructively complex, in particular in the event of large chain sag.

A further problem of typical motorcycle concepts may be seen in that the pinion diameter is limited in relation to the swing arm mounting by the clearance required for a pivot movement of the swing arm. Furthermore, it is problematic that the swing arm spar is situated adjacent to or below the driving strand of the chain, which implies a relatively large gauge of the swing arm spars and, in the case of a single-arm swing arm, makes the construction very complex, because the engine housing and the swing arm mounting must also be housed having an offset in relation to the transmission output shaft between the rear wheel and the output shaft of the transmission. Because in typical motorcycles, the swing arm spars must always lie between the top and bottom chain strands, the bottom spring strut attachment is located at a relatively low level, which in turn has an unfavorable effect on the spring strut progression.

As already noted, the clutch is typically situated on the transmission input shaft in normal motorcycles. Quite high torques occur on the transmission input shaft. To be able to transmit these high torques continuously, the clutch must be relatively large or run in an oil bath. Oil-bath clutches have the disadvantage that they may result in a relatively rapid contamination of the oil.

In normal motorcycles, the frame is also typically designed relatively complexly. The frame connection between the steering head and the swing arm axis lying behind the transmission output shaft must be guided past the clutch basket, which has a relatively large construction. In typical motorcycles, in which the swing arm axis is situated behind the drive pinion, the frame typically has frame tubes which extend below the engine past the clutch housing to the swing arm linkage points. Frame constructions of this type imply an unfavorable force flow and are also relatively heavy and costly to produce. The engine mounting is also relatively difficult with frames of this type, because the engine and the transmission are "embedded" very tightly in the frame.

It was already recognized many decades ago that it would be advantageous if the drive pinion which is provided for driving the chain or the drive belt was situated coaxially to the swing arm axis. Concept approaches are described, for example, in U.S. Pat. No. 6,755,272 B2, GB 558 387, FR 2370 625, WO 02/094649 A1, or EP 592 655 B1. However, in the motorcycles described therein, the drive pinion is not seated on the transmission output shaft, but rather on a separate shaft which is driven by the transmission output shaft via a chain or belt drive. This is a relatively cumbersome design and has therefore also not been successful.

In the textbook "Motorradtechnik [Motorcycle Technology]," 5th edition, Vieweg-Verlag, ATZ MTZ-Fachbuch, pages 295-298, edited by Jürgen Stoffregen, the basic idea of situating in the chain pinion coaxially to the pivot axis is also described. However, Stoffregen does not provide a concrete description of how the chain pinion may be driven and how the chain pinion is to be situated in relation to the transmission.

FR 1038 140 may also be included in the technical background.

The object of the present invention is to provide a completely novel vehicle concept which may be implemented in a simple design, which allows the problems described at the beginning to be avoided, as well as providing an engine/transmission unit as a basis for such a vehicle.

The starting point of the present invention is the consideration of providing a novel engine/transmission unit, which allows a correspondingly novel vehicle concept, in particular a novel motorcycle concept. Such an engine/transmission unit has an engine having a crankshaft which extends transversely to the travel direction of the vehicle, as well as a transmission and a clutch which may assume an open state and a closed state, the clutch allowing a torque transmission from the crankshaft to the transmission in the closed state. A central feature of this novel engine/transmission unit is that the clutch is situated coaxially to the crankshaft. The rotational axis around which the clutch disks rotate is thus transverse to the travel direction of the vehicle or the motorcycle.

The advantage results due to the coaxial configuration of crankshaft and clutch that the clutch-in contrast to typical vehicle engine/transmission units, in which the clutch is typically situated on the transmission input shaft-operates at higher speeds and lower torques and may thus be implemented more compactly. The clutch may thus have a comparatively small diameter, which in turn has the advantage that it does not extend up into the area of the transmission output shaft. The reason why this is so advantageous in regard to the overall vehicle concept will be explained in greater detail below.

It is expressly noted that the present invention is not restricted to the use of such an engine/transmission unit in motorcycles, but rather is applicable very generally in connection with vehicles. The following description and the claims are also to comprise multiwheel vehicles in addition to motorcycles, such as three-wheeled vehicles or four-wheeled vehicles, in particular so-called "quads."

According to a refinement of the present invention, the vehicle has a frame and a rear wheel swing arm, which is situated so it is pivotable on a swing arm axis in relation to the frame, and a transmission having a transmission housing and a transmission output shaft projecting out of the transmission housing. A "transmission output pinion" is situated on the transmission output shaft, which is coupled to a chain wheel, which drives a rear wheel or rear wheels of the vehicle situated in the rear wheel area of the vehicle via a traction mechanism, such as a chain or a toothed belt.

According to a refinement of the present invention, the transmission output pinion situated on the transmission output shaft is situated coaxially to the swing arm axis. A coaxial configuration of the transmission output pinion, i.e., the pinion which drives the chain or the belt, and the swing arm axis has the advantage that practically no sag of the "traction mechanism," i.e., the drive chain or the drive belt, has to be maintained for the spring compression of the rear wheel swing arm, as is the case for typical motorcycles having a chain or belt drive. The problems connected with a chain sag are thus avoided from the beginning.

According to a refinement of the present invention, the swing arm axis, i.e., the pivot axis around which the rear wheel swing arm pivots, extends through the transmission/engine housing. When "engine/transmission housing" or "transmission housing" or "engine housing" are discussed in the following, these terms are each to be understood broadly. The terms "engine/transmission housing" or "transmission housing" or "engine housing" are to be understood very generally in the following description and in the patent claims as the housing of the transmission and/or the housing of the engine.

The swing arm axis extending through the transmission housing projects out of the transmission housing on opposite sides of the transmission housing. Ends of the swing arm axis may then be mounted in the frame of the vehicles so they are pivotable. The swing arm axis may be mounted in the frame by roller bearings or friction bearings. For example, taper roller bearings may be used for mounting the swing arm axis in the frame. The taper roller bearings may be situated in an O configuration, for example.

It is expressly noted that the swing arm does not necessarily have to be mounted in the frame. The swing arm may also be mounted to or on the transmission output shaft using bearings, e.g., needle bearings, if the transmission output shaft and the engine/transmission housing are implemented as sufficiently stable to support the forces introduced via the swing arm.

The rear wheel swing arm may be permanently connected to the swing arm axis. A simple possibility is to clamp the rear wheel swing arm to the swing arm axis using a clamp connection.

The transmission output shaft on which the transmission output pinion is situated is preferably mounted in the transmission housing by roller bearings.

According to a refinement of the present invention, the transmission output shaft is implemented as a hollow shaft. This has the advantage that the swing arm axis may be inserted very simply through the transmission output shaft, which allows very simple mounting and dismounting of the rear wheel swing arm.

As already noted, the engine/transmission unit may be installed in a vehicle in such a way that the crankshaft of the engine extends in a transverse direction, i.e., parallel to the swing arm axis of the vehicle. In contrast to most normal vehicles and/or motorcycles, in which the clutch is situated on the transmission input shaft, according to the present invention, the clutch is situated coaxially to the crankshaft and preferably on the crankshaft itself. Because higher speeds and smaller torques arise on the crankshaft than on the transmission output shaft, the clutch may be implemented smaller, i.e., having a smaller diameter, than in typical motorcycles.

In typical motorcycles, in which the clutch is situated on the transmission input shaft, the clutch overlaps the transmission output shaft seen in a side view of the vehicle. In typical motorcycles, a coaxial configuration of swing arm axis and transmission output pinion would not be possible at all, because the swing arm axis would penetrate the clutch.

In contrast, a configuration of the clutch on the crankshaft has the advantage that the clutch may be implemented more compactly and, seen in a side view of the vehicle, the clutch does not overlap the transmission output shaft and thus allows "through insertion" of the swing arm axis. Because smaller torques arise on the crankshaft than on the transmission input shaft, different types of clutches may be used, e.g., single-disk clutches, multiple disk clutches, dry clutches, wet clutches, etc.

A "drive element" of the clutch is preferably connected rotationally fixed to the crankshaft. An "output element" of the clutch is situated so it is rotatable in relation to the crankshaft and is connected to a primary pinion which is mounted so it is rotatable on the crankshaft. The output element may be a clutch basket which may be connected in one piece to the primary pinion. Alternatively thereto, the clutch basket and the primary pinion may also be implemented in two pieces. The primary pinion may be mounted on the crankshaft using a roller bearing or a friction bearing. The primary pinion is preferably mounted on the crankshaft using a needle bearing.

The torque may be transmitted from the primary pinion seated on the crankshaft via an intermediate wheel situated on an intermediate shaft to the transmission input shaft. The intermediate wheel or another gearwheel seated on the intermediate shaft engages with a gearwheel of the transmission input shaft, which is situated offset in relation to the intermediate shaft in the direction of the rear wheel swing arm. Multiple shiftable gearwheel stages which are permanently engaged are situated adjacent to one another on the transmission input shaft and on the transmission output shaft, via which the individual gears of the transmission may be engaged.

The basic principle of the present invention described above also allows, in contrast to the prior art, an optimum design of the frame, in particular an optimum design of the motorcycle frame in the case of a motorcycle.

According to a refinement of the present invention, the frame has at least two left and two right frame tubes. The left frame tubes are essentially mirror-identical to the right frame tubes. The frame tubes of each frame side intersect one another. "Intersect" in this context means that they run together and are connected to one another. The frame is preferably designed in such a way that the swing arm axis extends through the "intersection point" of the left frame tubes and through the intersection point of the right frame tubes. The engine and the transmission of the vehicle may be situated in the area between the left and the right frame tubes.

The left and the right frame tubes may each be differentiated by terms into a left and a right bottom frame tube and a left and a right top frame tube. Seen in a side view of the vehicle, the two bottom frame tubes may be essentially linear and extend forward up into an area below handlebars of the vehicle from the swing arm axis and be connected there to a steering head bearing tube. In a top view of the vehicle, the two bottom frame tubes are not necessarily linear, but rather may also be curved.

The two top frame tubes are situated above the bottom frame tubes and extend from an area below the handlebars or from a steering head bearing tube backward down to the pivot axis.

A frame designed in this way has multiple advantages. The engine, the transmission, and a radiator of the motorcycle may be inserted from below as a prefinished assembly into the area between the left and the right frame tubes, which significantly simplifies the mounting and/or dismounting.

While in typical motorcycles having a chain drive the frame tubes extend from the handlebars area below the engine and/or the transmission to the swing arm bearing of the rear wheel swing arm, according to the present invention, the left and the right frame tubes of the frame run laterally past the engine and/or the transmission from the handlebars area diagonally downward to the swing arm axis. This has the advantage in turn that a continuous radiator may be situated in an area below the bottom frame tubes and forward of the engine.

An air filter of the engine may be situated in a very space-saving way which is protected from sprayed water in the area proximal to the handlebars between the top and bottom frame tubes above the engine.

An onboard battery of the motorcycle may be situated in an area proximal to the swing arm axis between the top and bottom frame tubes above the transmission. The center of gravity of the vehicle is preferably located in this area. Situating the relatively heavy onboard battery in the area of the center of gravity of the vehicle very significantly improves the handling of the vehicle.

The frame described above also has significant advantages in regard to the configuration of a spring strut. The spring strut may be situated between the frame and the rear axle swing arm. It has the object of springing and damping movements of the spring strut occurring during travel. A bottom end of the spring strut may be connected in an articulated way to the swing arm. A top end of the spring strut may be connected in an articulated way to the frame. The spring strut extends from bottom rear diagonally to top forward.

In the frame design described above, it is advantageous to situate the spring strut in such a way that, seen in a side view of the motorcycle, it is in an essentially linear extension of the forward sections of the top two frame tubes. In a configuration of this type, the forces exerted by the spring strut on the frame are essentially introduced into the frame in the longitudinal direction of the forward sections of the top frame tubes. The top frame tubes function as "compression bars" and are primarily loaded with pressure and only slightly with bending upon spring compression of the rear wheel swing arm. In contrast to typical motorcycles, the frame thus allows a significantly flatter installation of the spring strut supports, which allows a high progression during spring compression of the spring strut.

The fuel tank may also be situated in a more favorable position closer to the center of gravity in the vehicle concept described above than is the case in most normal vehicles and/or motorcycles. According to a refinement of the present invention, the fuel tank is situated in an area above the spring strut and below the seat of the vehicle. The tank cover of the fuel tank may be situated on the top side of the fuel tank below the seat. The seat then only has to be removed for filling. In comparison to typical motorcycles, in which the fuel tank is situated forward of the seat, a configuration in the area above the spring strut has the advantage that the center of gravity of the vehicle may thus be lowered, which further improves the handling.

Alternatively thereto, an access opening or a "hole" may also be provided in the seat, via which the tank connecting piece of the fuel tank is accessible. Filling is then also possible without removing the seat.

Other objects, advantages and novel features of the present invention will become apparent from the following detailed description of the invention when considered in conjunction with the accompanying drawings.

BRIEF DESCRIPTION OF THE DRAWINGS

FIGS. 16-19 show the intermediate drive situated between the primary pinion and the transmission input shaft in an embodiment of the present invention.

DETAILED DESCRIPTION

Figure 1:
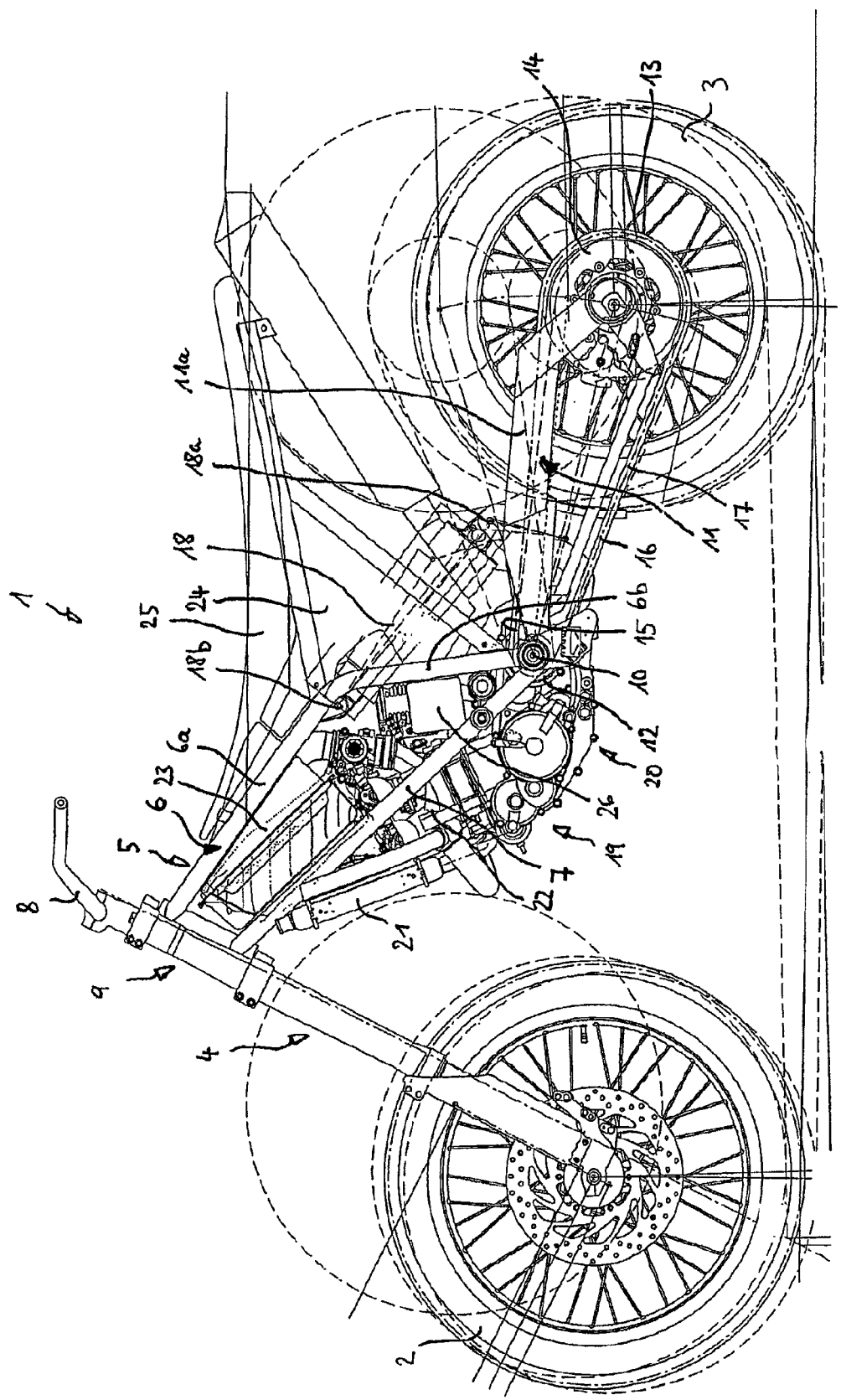
FIG. 1 shows a side view of a motorcycle according to an embodiment of the present invention.

FIG. 1 shows a motorcycle 1 having a front wheel 2 and a rear wheel 3. The front wheel 2 is connected via a telescoping fork 4 to a frame 5 of the motorcycle 1. In the side view shown in FIG. 1, a top left frame tube 6 and a bottom left frame tube 7 of the frame 5 may be recognized. The top left frame tube 6 may be divided into a forward section 6a and a rear section 6b. The top left frame tube 6 is curved in the transition area between the frame tube sections 6a, 6b. The forward section 6a is essentially linear in the side view shown in FIG. 1. The bottom left frame tube 7 is also essentially linear in the side view shown in FIG. 1. The two frame tubes 6, 7 extend from an area below handlebars 8 from a steering head bearing 9 diagonally downward to the rear. The section 6b of the top left frame tube 6 "intersects" the bottom left frame tube 7.

Figure 8:
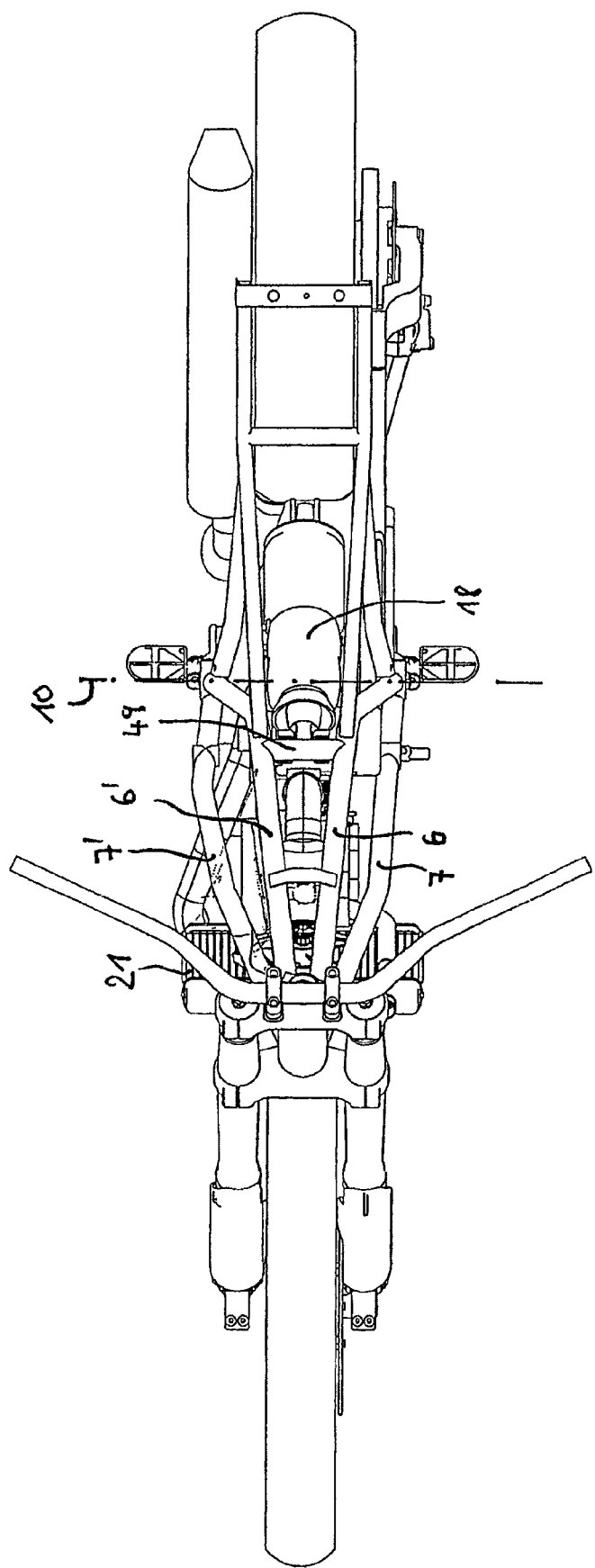
FIG. 8 shows a top view of the motorcycle of FIG. 1.

As may be seen best from FIG. 8, the frame 5 is constructed essentially symmetrically in relation to a middle longitudinal axis of the motorcycle. The frame thus has a top right frame tube 6' corresponding to the top left frame tube 6 and a bottom right frame tube 7' corresponding to the bottom left frame tube 7. A swing arm axis 10, which is shown by dashed lines in FIG. 8, extends through the "intersection points" of the frame tubes 6, 7 or 6', 7'. The swing arm axis 10 is visible best in FIG. 5. The rear wheel swing arm 11 (cf. FIG. 5) is fastened to the swing arm axis 10. The rear wheel swing arm 11 is thus situated so it is pivotable in relation to the frame 5 via the swing arm axis 10. As is also best visible from FIG. 5, a transmission output pinion 12, which drives a chain 13 of the motorcycle, is situated coaxially to the swing arm axis 10. The transmission output pinion 12 is coupled via the chain 13 to a chain wheel 14, which drives the rear wheel 3.

As is obvious from FIG. 1, the top bar 11a of the rear wheel swing arm is hollow. A driving strand 15 of the chain 13 extends through the top bar 11a of the rear wheel swing arm 11. The top bar 11a is also used simultaneously as a chain protector. A bottom strand 16 of the chain 13 runs through a casing 17 and is thus also protected.

It is expressly noted that the chain does not necessarily have to be guided through the top bar of the rear wheel swing arm, but rather may also be situated "outside."

A spring strut 18 is situated between the frame 5 and the rear wheel swing arm 11. As is obvious from FIG. 1, the spring strut 18 is situated relatively flat in comparison to typical motorcycles. A bottom rear end 18a of the spring strut 18 is connected in an articulated way to the rear wheel swing arm 11. A top front end 18b of the spring strut 18 is connected in an articulated way to a transverse tube of the frame 5 (not shown here). As is obvious from FIG. 1, the spring strut 18 is essentially in a linear extension of the top frame tube 6 in the side view of the motorcycle shown here. A very favorable force introduction into the frame 5 thus results. The top frame tubes 6, 6' (compare FIG. 8) are thus primarily loaded with pressure. Because of the relatively "flat" configuration of the spring strut 18, a relatively high spring progression also results upon spring compression of the rear wheel 3, which also has a favorable effect on the driving behavior of the motorcycle 1. The spring progression is significantly higher than in typical motorcycles, in which the spring strut is installed more steeply.

As is obvious from FIG. 1, the frame 5 of the motorcycle 1 is essentially open on the bottom. This has the advantage that the engine 19, the transmission 20, and a radiator 21 may be inserted from below into the frame 5 easily as a "prefinished power unit" during the assembly of the motorcycle 1, which significantly simplifies the assembly effort in comparison to typical motorcycles, in which frame tubes extend below the engine and/or the transmission.

The frame conception described above in connection with the coaxial configuration of the swing arm axis 10 and the transmission output pinion 12 allows an installation position of the engine 19 and the transmission 20 in which the engine 19 is situated further to the rear than in typical motorcycles and the cylinder of the single-cylinder engine shown in FIG. 1 extends forward and outward comparatively flatly.

A so-called "air box" 23, which contains an air filter, via which the engine 19 is supplied with intake air, is situated in the area below the handlebars 8, behind the steering head bearing 9, and between the top frame tubes 6, 6' and the bottom frame tubes 7, 7'. Because the air box is relatively light and thus only slightly impairs the handling of the motorcycle, it is situated relatively far upward on the motorcycle 1, approximately where the tank is located in typical motorcycles.

Because of the relatively flat position of the spring strut 18, the fuel tank may be situated in a favorable position closer to the center of gravity than is the case in most typical motorcycles. The fuel tank 24 is located in a position above the spring strut 18 and below a seat 25 of the motorcycle 1. The fuel tank 24 is thus situated relatively close to the center of gravity of the motorcycle, which is approximately in the area of the spring strut 18. The handling of the motorcycle 1 improves due to the configuration of the fuel tank 24 in proximity to the center of gravity.

A further relatively heavy vehicle component is the onboard battery 26. The onboard battery 26 is situated in an area diagonally above and/or forward of the swing arm axis 10 between the top frame tubes 6, 6' and the bottom frame tubes 7, 7' and thus also in proximity to the center of gravity of the motorcycle, which further improves the handling. The onboard battery may particularly be situated "behind" the engine/transmission unit. In this context, "behind" generally means in the area between the engine/transmission unit and the rear wheel or the rear wheels of the vehicle. The onboard battery may particularly be situated below the fuel tank.

Figure 2:
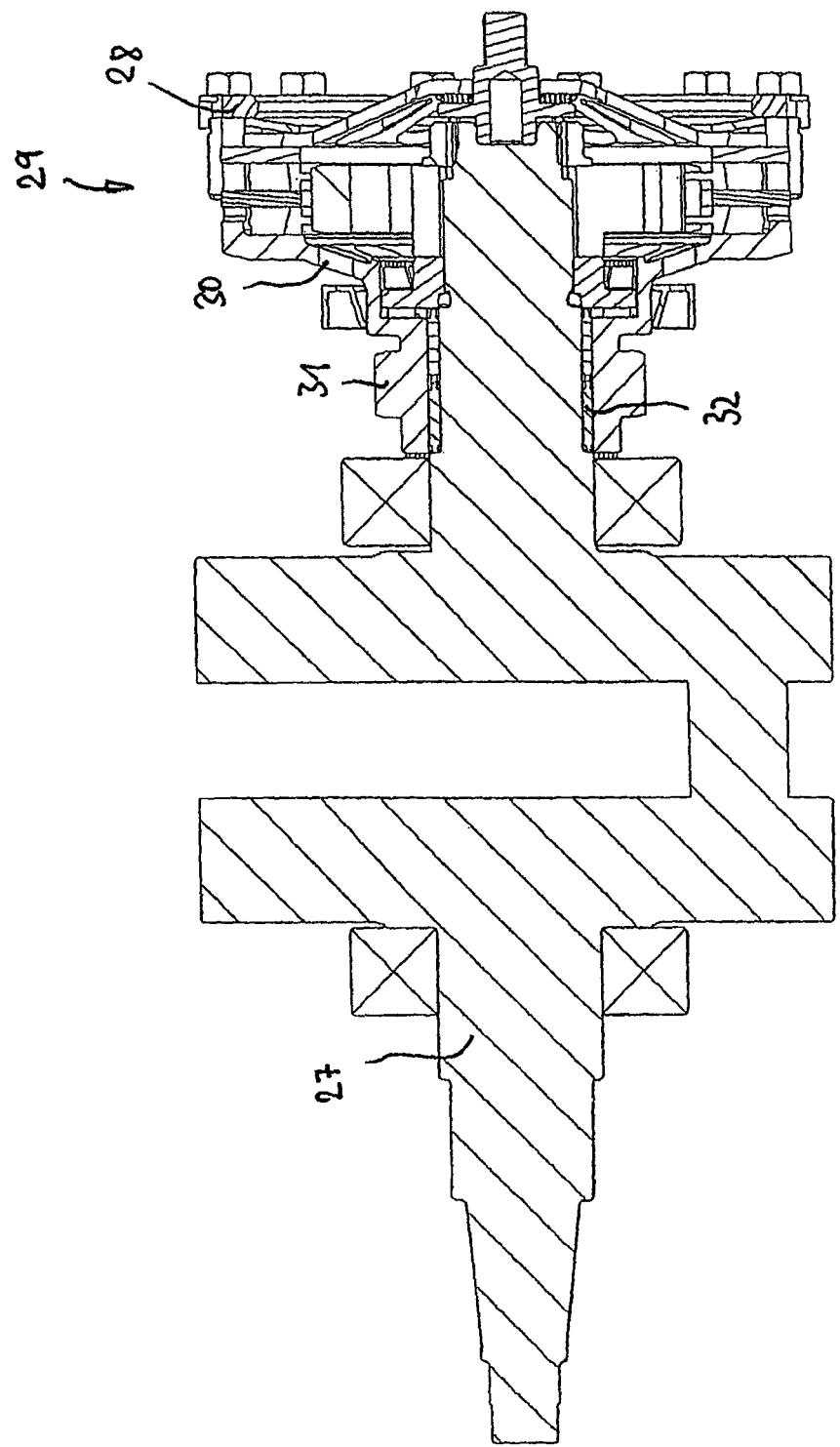
FIG. 2 shows the crankshaft and the clutch of the motorcycle of FIG. 1.

The engine 19 of the motorcycle 1 is installed in such a way that the crankshaft 27 (cf. FIG. 2) extends in the transverse direction of the motorcycle, i.e., perpendicularly to the plane of the drawing of FIG. 1 and parallel to the swing arm axis 10. The term "transverse direction" may also be interpreted so that the crankshaft is transverse to the main travel direction and thus transverse to the longitudinal direction of the motorcycle. The crankshaft 27 is best visible from FIG. 2. In FIG. 2, the crankshaft of a single-cylinder engine is shown. The present invention is also suitable for transversely installed multi-cylinder engines, of course. The piston (not shown) of the engine transmits a piston force and thus causes a rotation of the crankshaft 27. The torque is transmitted from the right end of the crankshaft 27 shown in FIG. 2 to a drive element 28 of a multi-disk clutch 29.

In contrast to typical motorcycles, in which the clutch is typically situated on the transmission input shaft, the clutch 29 is situated on the crankshaft 27. When the clutch 29 is closed, the torque is transmitted from the drive element 28 to a clutch basket 30 functioning as an "output element," which is connected to a primary pinion 31 in one piece here. The clutch basket does not necessarily have to be connected in one piece to the primary pinion, of course. A riveted connection is also conceivable at this point. The clutch basket 30 and/or the primary pinion 31 is/are mounted via a needle bearing 32 on the crankshaft 27.

In comparison to typical motorcycles, in which the clutch is situated mounted on the transmission input shaft, a configuration on the crankshaft has the advantage that lower torques are to be transmitted there, which allows a more compact construction of the clutch.

Figure 3:
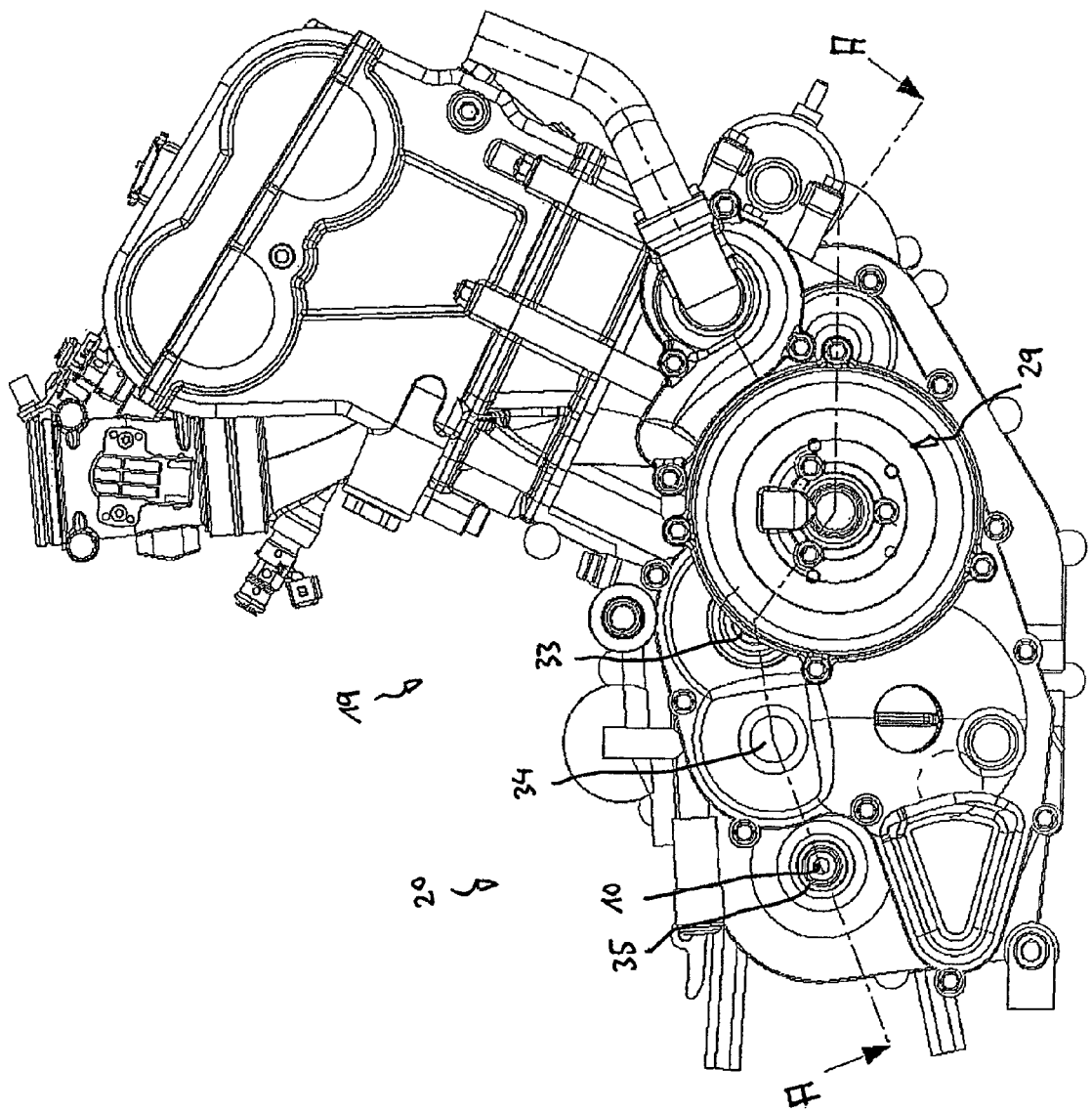
FIG. 3 shows a side view of the engine and the transmission of the motorcycle of FIG. 1.

FIG. 3 shows a side view of the engine/transmission unit, from the side opposite to the side shown in FIG. 1, i.e., seen from the "right" side of the motorcycle 1. The position of the clutch 29, an intermediate shaft 33, a transmission input shaft 34, and the transmission output shaft 35 situated coaxially to the swing arm axis 10 may be recognized. Furthermore, a section line A-A is shown.

Figure 4:
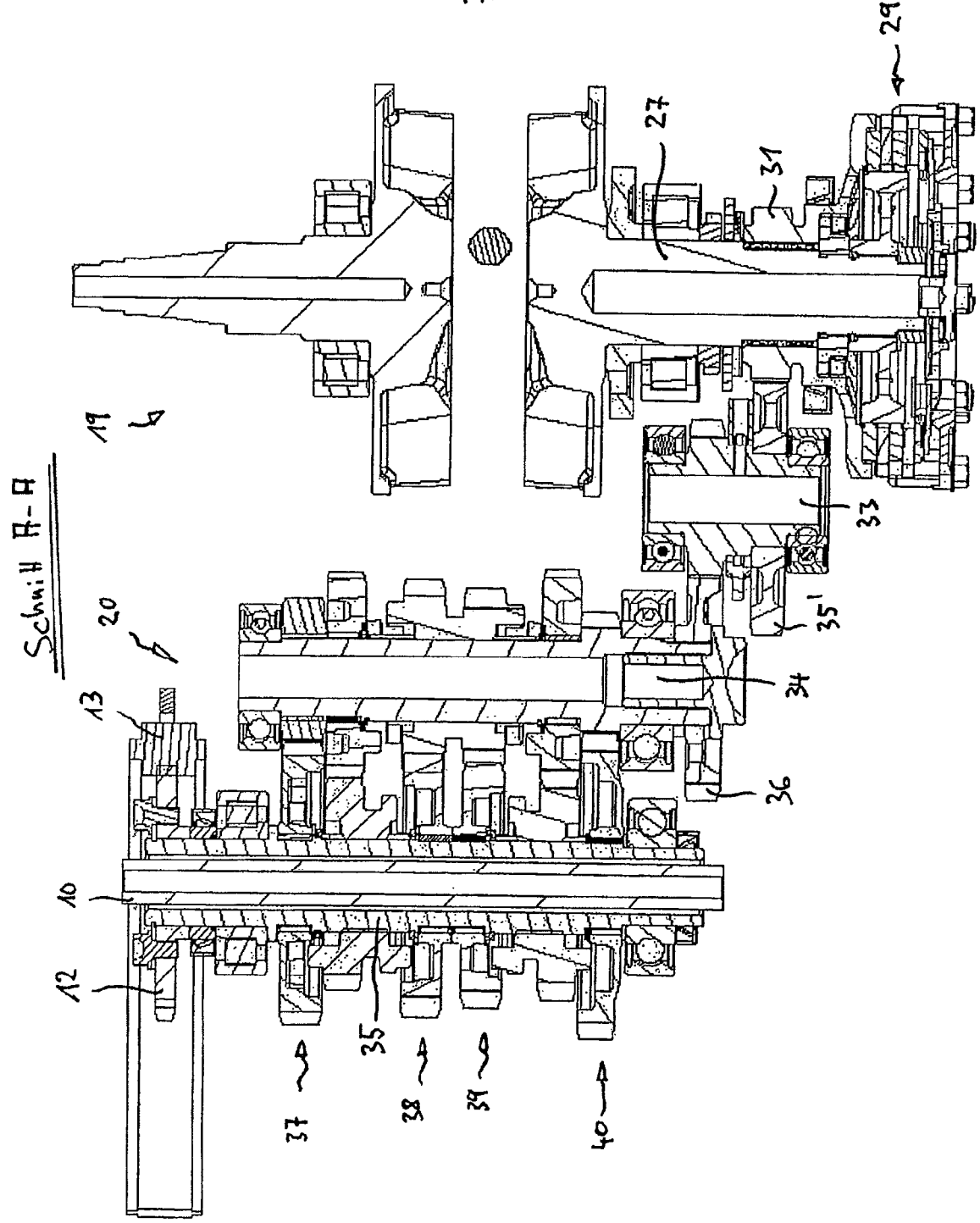
FIG. 4 shows a section along section line A-A shown in FIG. 3.

FIG. 4 shows a section through the engine/transmission unit along section line A-A. As is obvious from FIG. 4, the torque is transmitted from the crankshaft 27 via the clutch 29 to the primary pinion 31 and from the primary pinion 31 to an intermediate gearwheel 35', which is situated on the intermediate shaft 33. A gearwheel 80 connected rotationally fixed to the intermediate wheel 35' engages with a transmission input pinion 36 is a gear wheel, which is situated on the transmission input shaft 34. Multiple shiftable gearwheel stages 37-40 are situated on the transmission input shaft 34 and on the transmission output shaft 35, via which individual gears of the transmission 20 may be engaged. The torque is transmitted via one of these gearwheel stages 37-40 to the transmission output shaft 35 and from there via the transmission output pinion 12 to the chain 13 coupled to the rear wheel 3 as a function of the engaged gear.

Figure 5:
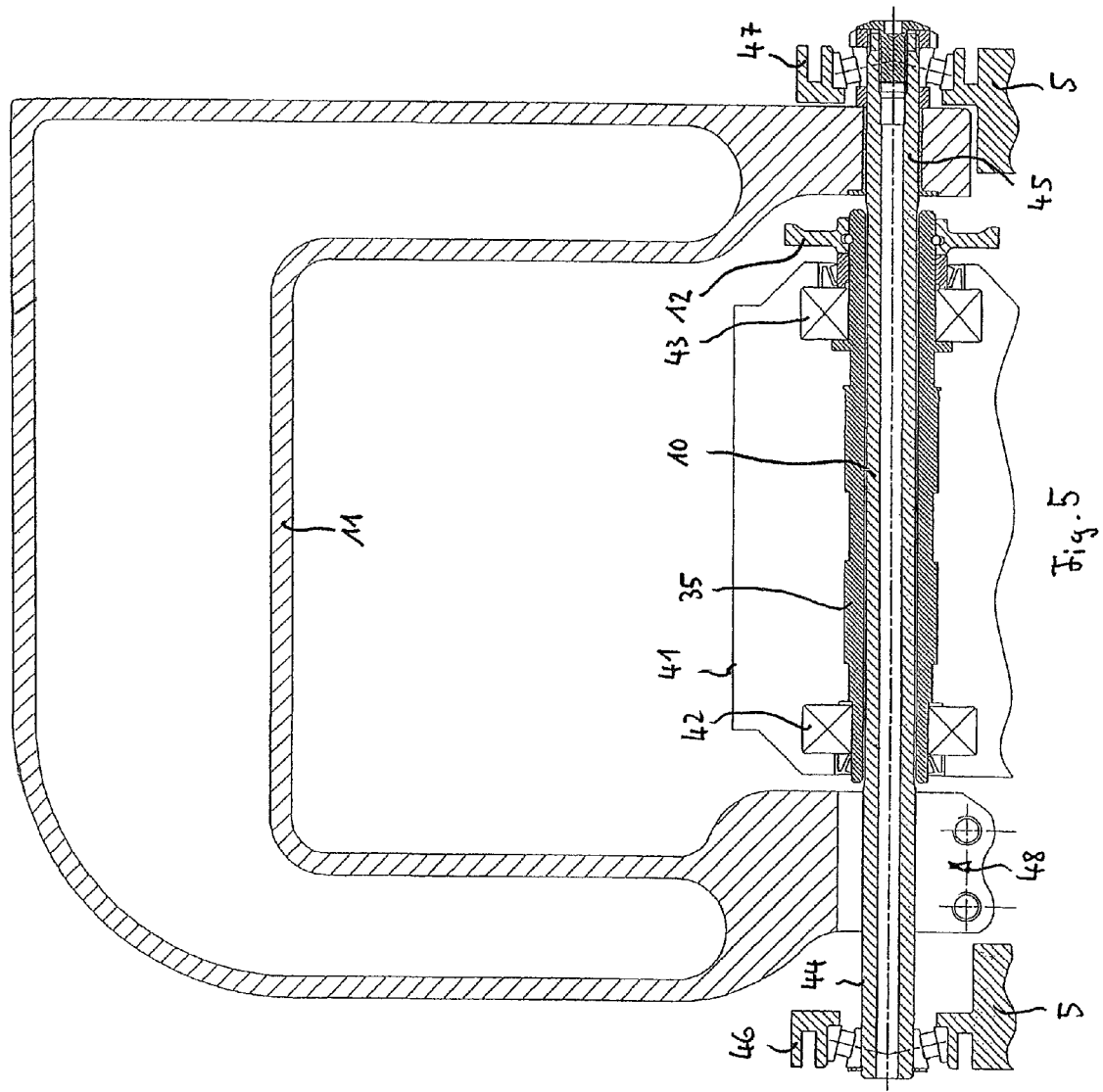
FIG. 5 shows a cross-section through the swing arm axis, the transmission output shaft, and the rear axle swing arm of the motorcycle of FIG. 1.

As is visible best from FIGS. 4 and 5, the transmission output shaft 35 is a hollow shaft. The swing arm axis 10 is inserted through the transmission output shaft. The transmission output shaft 35 extends out of the transmission housing 41 on one side of the transmission housing 41. The transmission output pinion 12 is situated on the projecting section of the transmission output shaft 35. The transmission output shaft 35 is mounted in the transmission housing 41 using two roller bearings 42, 43.

As is visible best from FIG. 5, the swing arm axis 10 extends through the transmission output shaft 35 and thus also through the transmission housing 41. Ends 44, 45 of the swing arm axis 10 project out of the transmission housing 41 and are mounted in the frame 5 of the motorcycle 1 using two taper roller bearings 46, 47, which are installed here in an O configuration. The swing arm axis 10 is thus an "insert axis," which allows simple mounting and dismounting of the rear wheel swing arm 11.

The rear wheel swing arm 11 is clamped using a clamp connection 48 to the swing arm axis 10 and is thus positioned fixed in relation to the swing arm axis 10. Since the swing arm axis 10 is mounted in the frame 5 via the taper roller bearings 46, 47, the rear wheel swing arm 11 may be pivoted around the swing arm axis 10 in relation to the frame 5.

Figure 6:
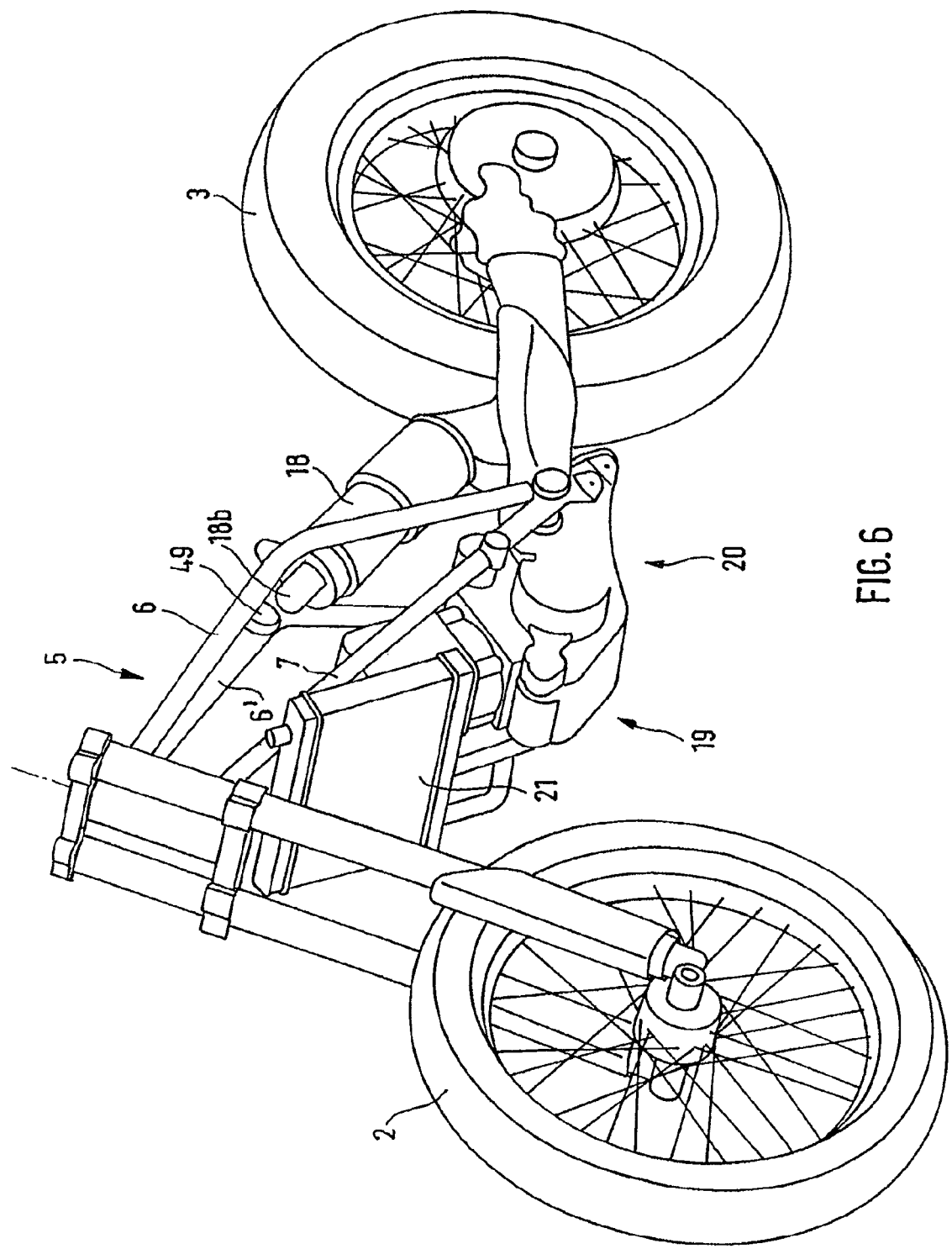
FIG. 6 shows a perspective view of a schematically illustrated motorcycle according to an embodiment of the present invention.

FIG. 6 shows a very schematic illustration of a motorcycle 1 according to the present invention in a perspective illustration. In this illustration, the flat installation of the spring strut 18 may be recognized especially well. The forward end 18*b* of the spring strut 18 is connected in an articulated way to the frame 5 via a transverse strut 49 which connects the two top frame tubes 6, 6' to one another. As already noted, a strong spring strut progression results due to the flat configuration of the spring strut 18, which significantly improves the driving behavior of the motorcycle in comparison to typical motorcycles, in which the spring strut is installed more steeply.

Figure 7:
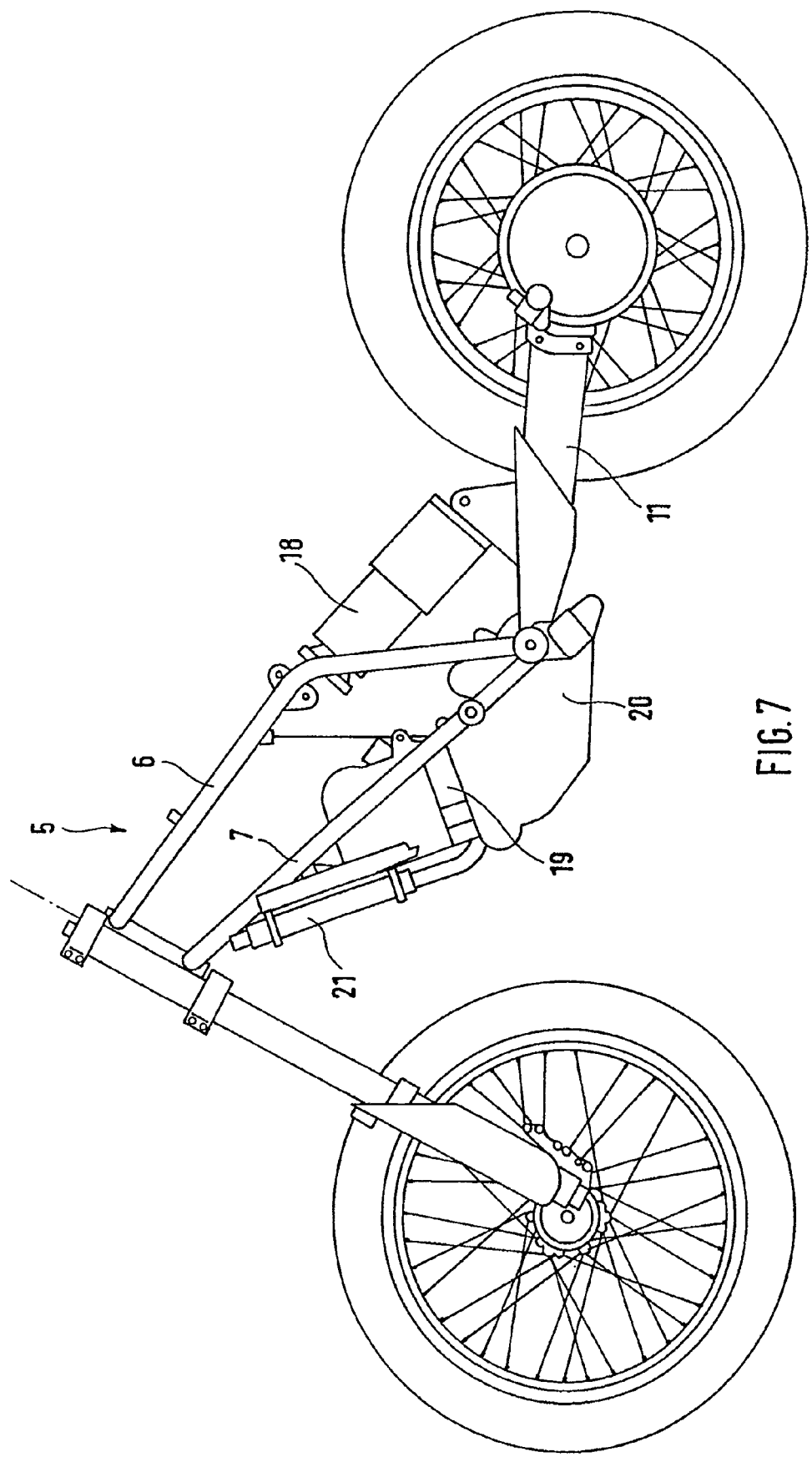
FIG. 7 shows a side view of the schematically illustrated motorcycle of FIG. 6.

FIG. 7 shows the motorcycle of FIG. 6 in a side view. The flat installation position of the spring strut 18 and the very simple construction of the frame 5 may again also be recognized very well here. It may also be recognized very well from FIGS. 6, 7 that the engine 19, the transmission 20, and the radiator 21 may be inserted from below into the frame 5 during the assembly of the motorcycle 1 as a prefinished "power unit," because in contrast to typical motorcycles, no frame tubes extend "to the rear" below the engine 19 and/or the transmission 20 to the linkage point of the rear wheel swing arm.

As is obvious from FIGS. 6 and 8, this frame conception also allows the positioning of a continuous, i.e., one-piece radiator 21 below the bottom frame tubes 7, 7'.

Figure 9:
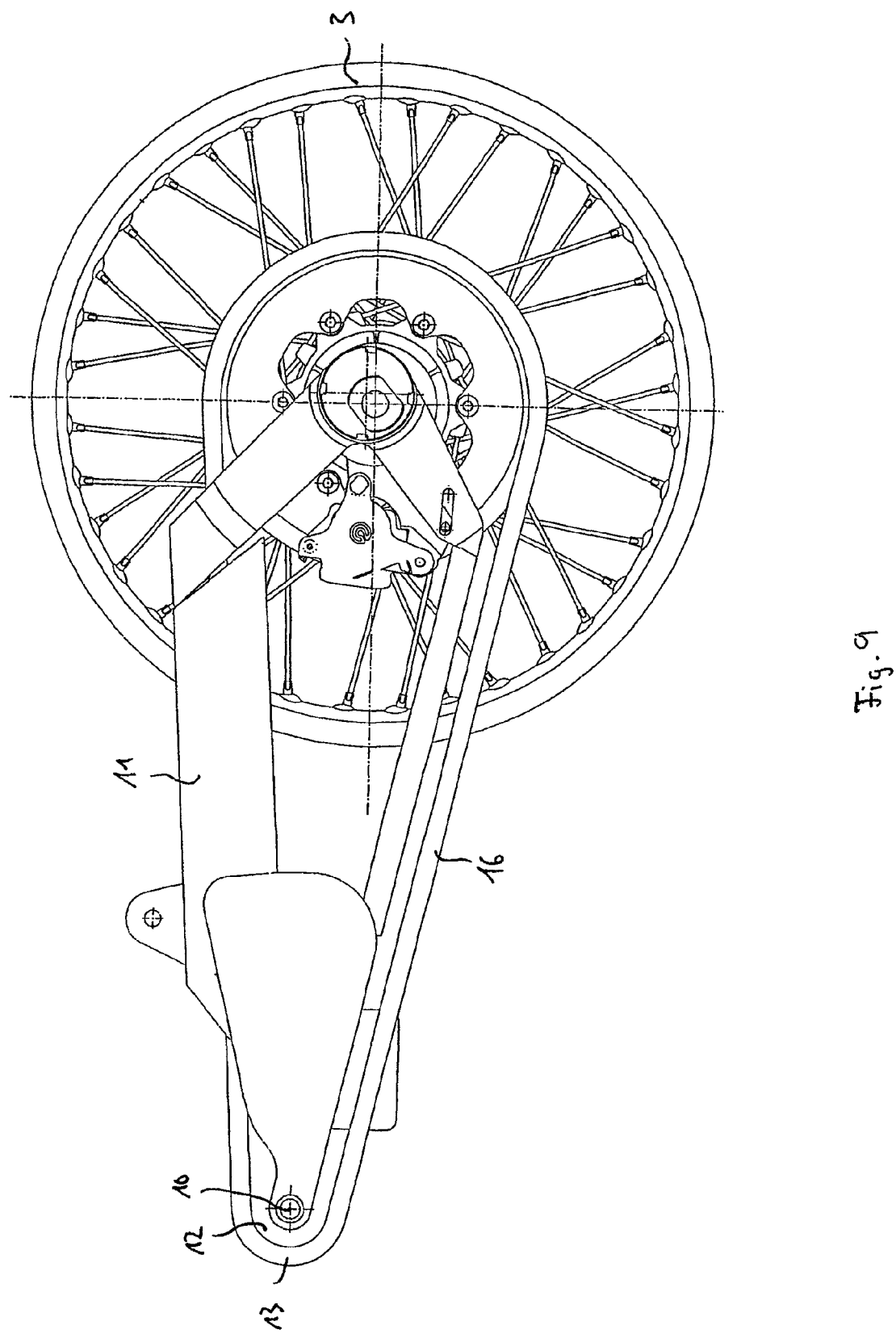
FIG. 9 shows the rear wheel swing arm and the rear wheel mounted therein of the motorcycle of FIG. 1.

FIG. 9 shows a side view of the rear wheel swing arm 11 of the rear wheel 3 in an enlarged illustration.

Figure 10:
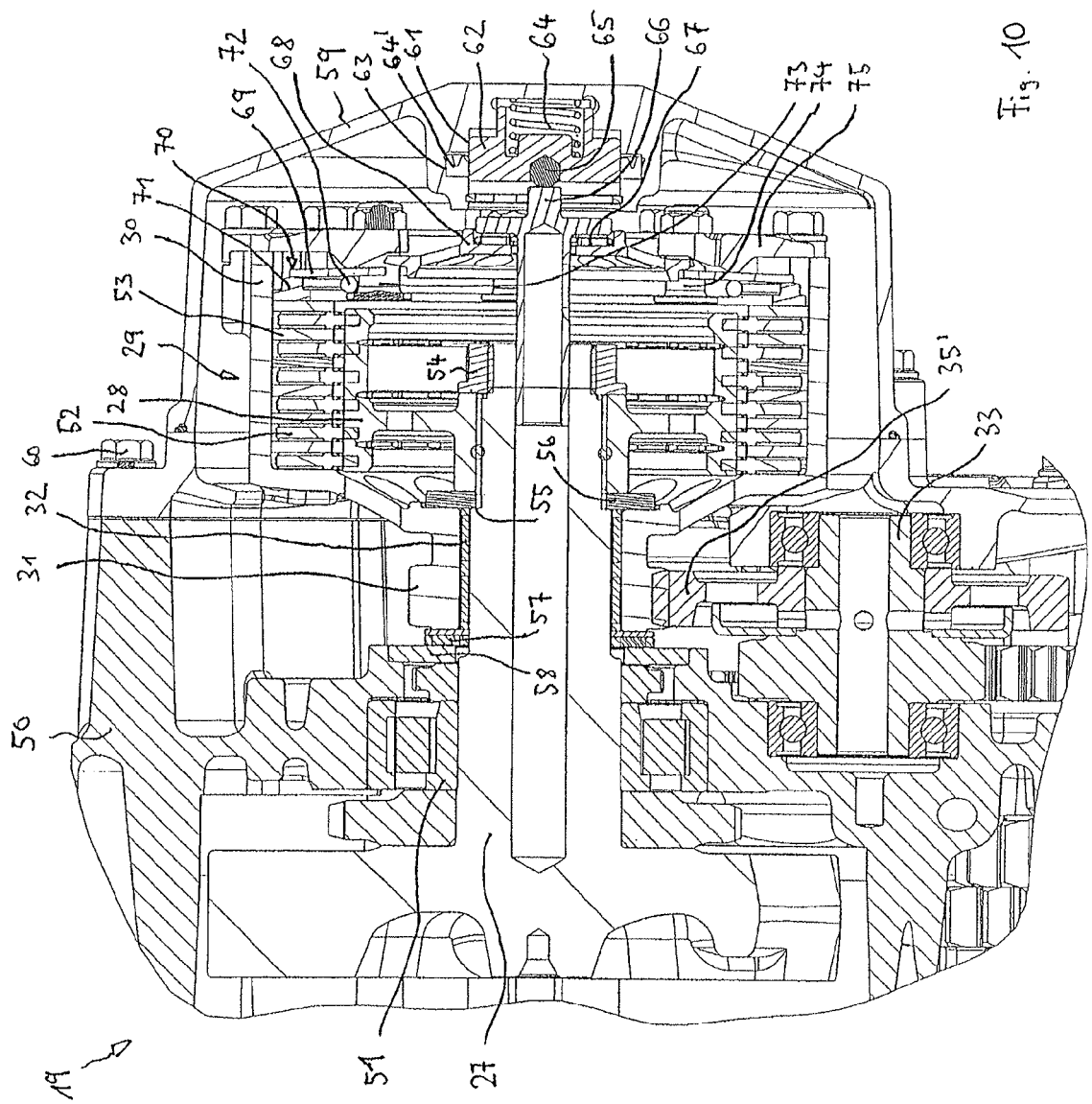
FIG. 10 shows an embodiment according to the present invention in the area of the crankshaft and/or clutch in a sectional illustration.
Figure 11:
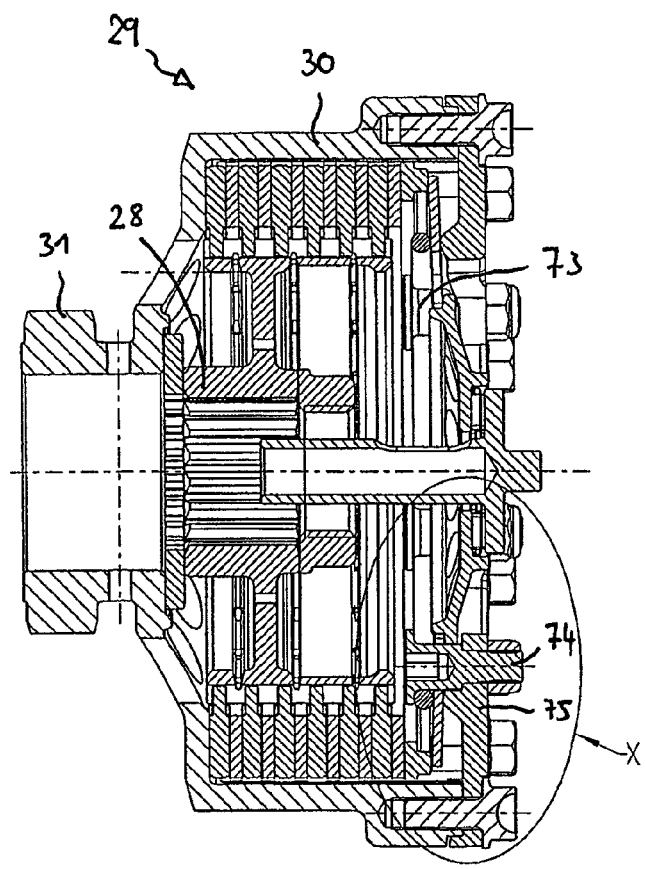
FIG. 11 shows a sectional illustration of the clutch of the exemplary embodiment from FIG. 10.

FIG. 10 shows an exemplary embodiment of a vehicle engine 19 in the area of the clutch. The engine 19 has an engine housing 50, in which the crankshaft 27 is mounted by roller bearings 51. A clutch 29, which is implemented as a lamellar (or "multi-plate") clutch in the exemplary embodiment shown here, is situated in the area of the right end of the crankshaft 27. The lamellar clutch 29 has a drive element, which is also referred to in the following as an "internal part" or "driver element" 28, and is connected rotationally fixed to the crankshaft 27 via wedge teeth and/or a serrated profile in the exemplary embodiment shown here. Multiple lamellae (or "drive plates") 52 suspended radially inward (i.e., at their radially-inner edges) are connected rotationally fixed to the drive element 28, which engage between external lamellae (or "driven plates") 53, which are situated rotationally fixed in an output element 30 of the clutch. The output element 30 is also referred to in the following as a "clutch basket."

The clutch basket 30 is connected in one piece to the primary pinion 31. The clutch basket 30 is mounted so it is rotatable on the crankshaft 27 in the area of the primary pinion 31 using needle bearings 32. In the axial direction, i.e., in the longitudinal direction of the crankshaft 27, the lamellar clutch 29 is fixed as follows. The drive element or the internal part 28 is tensioned against a shoulder 55 of the crankshaft using a shaft nut 54.

In contrast, the clutch basket 30 is fixed in the axial direction by a disk 56, which is clamped between the internal part 28 and the shoulder 55. In the opposite direction, the clutch basket 30 and/or the primary pinion connected in one piece thereto is/are supported via axial needle bearings 57 and an intermediate plate or intermediate disk 58 on the housing 50 of the engine 19. This is a significant difference in relation to many typical clutch configurations, in which the clutch is frequently supported via shaft bearings in the axial direction. In contrast thereto, in the exemplary embodiment of FIG. 10, the forces which arise upon actuation of the clutch are not transmitted to the crankshaft 27 and thus not to the roller bearings 51. The lamellar clutch 29 thus exerts practically no influence on the running of the engine 19 and/or the crankshaft 27.

A further special feature of the exemplary embodiment shown in FIG. 10 is that the force flux is not introduced, as in most lamellar clutches, via the clutch basket and transmitted via the lamellae to the clutch internal part, but rather the reverse. In the exemplary embodiment of FIG. 10, the torque is transmitted from the crankshaft to the internal part 28 and via the lamellae 52, 53 outward to the clutch basket and the primary pinion 31 connected thereto in one piece. The primary pinion 31 in turn engages with the intermediate wheel 35' of an "intermediate drive" situated on the intermediate shaft 33, via which the torque is transmitted to the transmission input shaft.

As is obvious from FIG. 10, a clutch cover 59 which covers the lamellar clutch 29 is flanged onto the housing 50 of the engine 19 and screwed to the housing 50 using fastening screws 60. A cylindrical recess 61 is provided in the clutch cover 59, which is also referred to in the following as a "slave cylinder." A slave piston 62 is situated so it is displaceable in the cylindrical recess 61. The slave cylinder 61 has a peripheral grooved recess 63, in which a seal 64' is inserted, which seals the slave cylinder 61 in relation to the slave piston 62.

The configuration of the seal 64' in the grooved recess 63 of the slave cylinder 61 has the advantage that the seal may be implemented more cost-effectively than in typical systems, in which the seal is typically integrated in the piston. In typical configurations, in which the seal is integrated in the piston, the external part, i.e., the slave cylinder has to be coated to avoid wear. A coating of this type of the slave cylinder is relatively costly. In the exemplary embodiment shown in FIGS. 1 through 13, in contrast, the slave cylinder 61 does not need to be coated, but rather only the slave piston 62, which is significantly more cost-effective.

The slave piston 62 is held in a defined position using a spring 64, in which a ball 65 inserted in the slave piston 62 presses against a disengaging element 66. Using the slave piston 62, a pressure force acting in the axial direction may be transmitted to a disengaging ring 68, which is provided for opening the lamellar clutch 29, via the ball 65, the disengaging element 66, and an axial bearing 67.

If the slave piston 62 is not impinged with pressure, the lamellar clutch 29 is held closed by a disk spring 69. The disk spring 69 has a radial external area 70, which presses against a pressure plate 71, which presses the lamellar assembly together in the closed state of the clutch and thus couples the internal part 28 and the clutch basket 30 friction-locked to one another. The disk spring 70 is supported by a ring 72 extending around the circumference of the clutch basket 30.

A constructive feature of the exemplary embodiment shown in FIG. 10 which is particularly to be cited is that the disk spring 69, the ring 72, and the disengaging ring 68 are fixed and centered in a way having a very simple design, namely via multiple collar screws situated distributed around the circumference, of which only two collar screws 73, 74 may be seen in FIG. 10.

Figure 12:
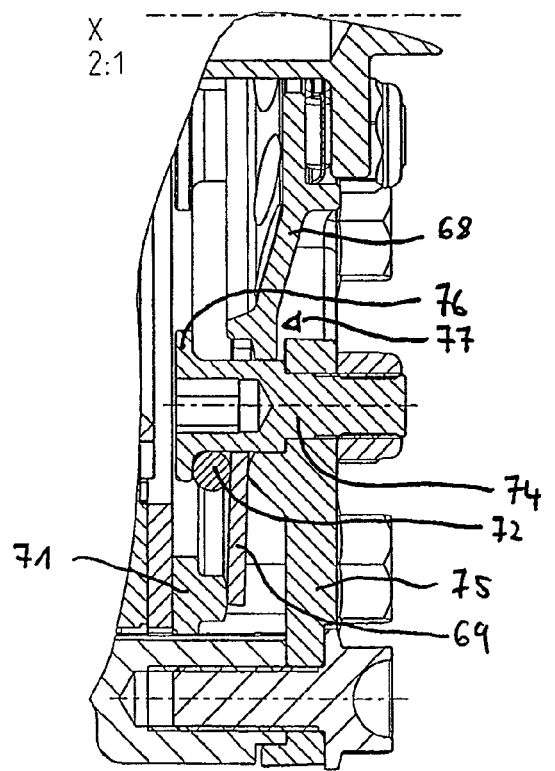
FIG. 12 shows a detail drawing of area X of FIG. 11.

As is visible best from FIG. 12, the collar screws 73, 74 are screwed to a cover-like element 75 of the clutch basket 30. The collar screws have a peripheral collar or a shoulder 76 on their end facing toward the interior of the clutch basket 30. The ring 72 is supported on the shoulders 76 of the collar screws. The disk spring 69, the ring 72, and the disengaging ring 68 are centered using the collar screws 74.

To open the clutch, i.e., to relieve the disk spring assembly of the lamellar clutch 29, the slave piston 62 is impinged with pressure and displaced to the left. The opening force exerted by the slave piston 62 is transmitted to the disengaging ring 68, which is also displaced to the left. As is visible best from FIG. 12, a radial external area 77 of the disengaging ring 68 comes into contact with a radial internal area of the disk spring 69. The axial force exerted by the disengaging ring 68 on the disk spring 69 displaces the radial internal area of the disk spring in FIG. 12 somewhat to the left, which, because of the contact of the disk spring on the ring 72, has the result that the radial external area of the disk spring 69 lifts off of the pressure plate 71, which results in relief of the disk spring assembly and thus in opening of the lamellar clutch 29.

Figure 13:
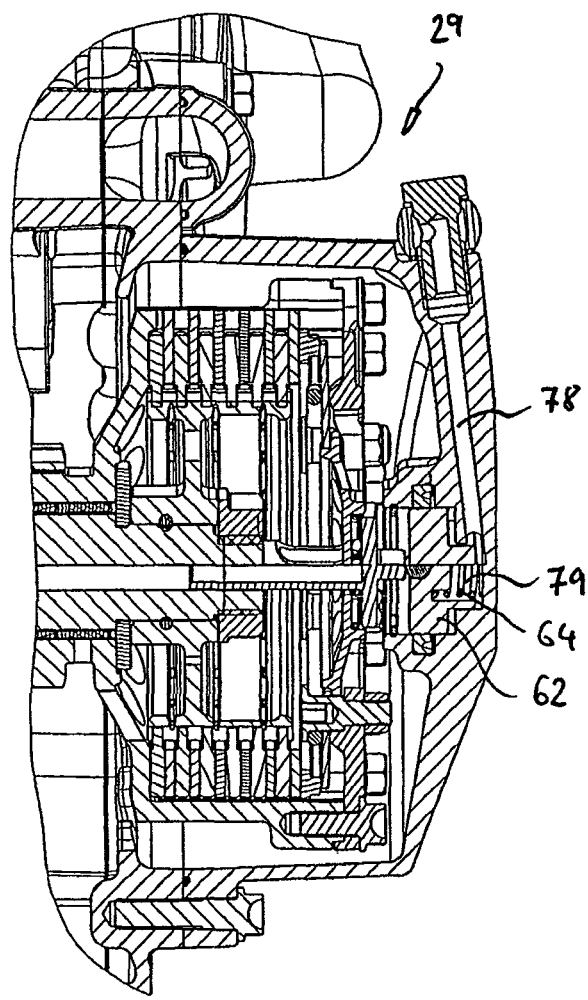
FIG. 13 shows an embodiment of a clutch according to the present invention, a hydraulic attachment connected to the slave cylinder being integrated in the clutch cover.

FIG. 13 shows a section through the lamellar clutch 29 in another sectional plane. It is clearly visible from this illustration that a hydraulic channel 78 is integrated in the clutch cover 29, which opens into a chamber 79, in which the spring 64 is situated. The slave piston 62 may be impinged with pressure via the hydraulic channel 78, which is connected to an actuating apparatus (not shown in greater detail here), e.g., a manual valve situated on the motorcycle handlebars, which functions as a "sensor."

Figure 14:
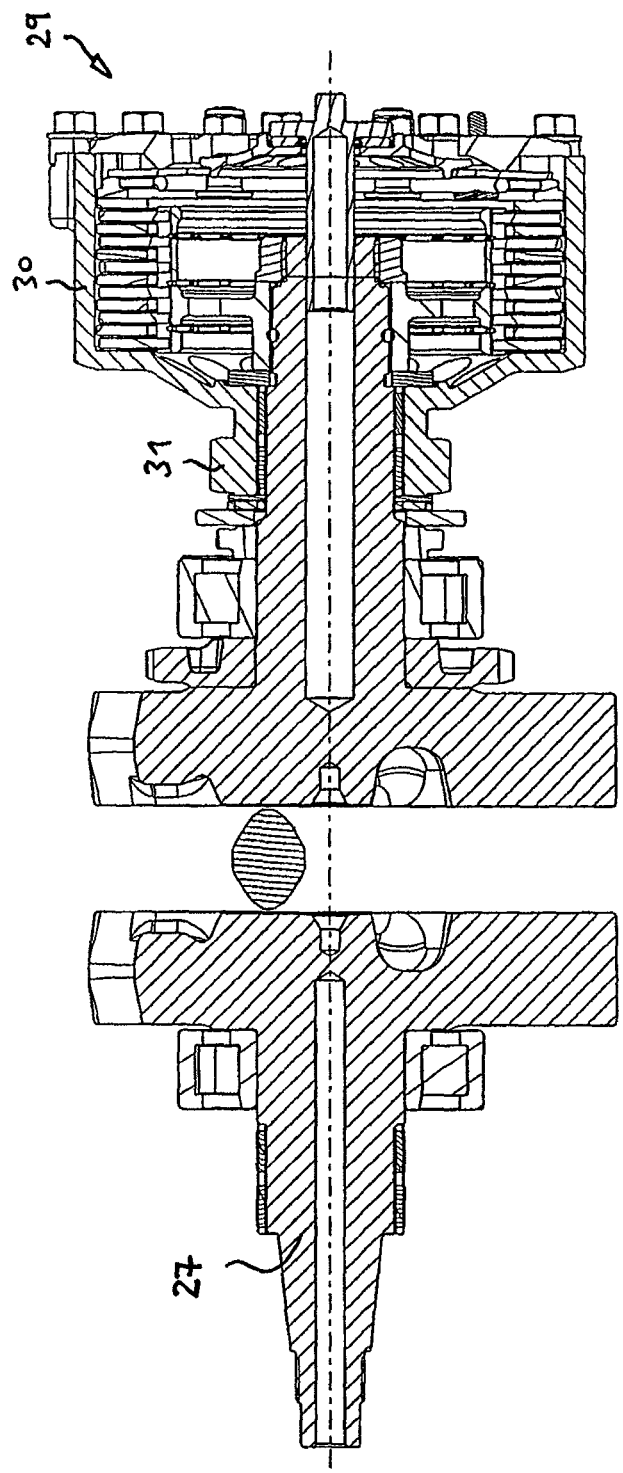
FIG. 14 shows a detail drawing of a clutch situated on the crankshaft according to an embodiment of the present invention.

FIG. 14 shows the overall configuration of the crankshaft 27 and the lamellar clutch 29 situated on the crankshaft 27.

Figure 15:
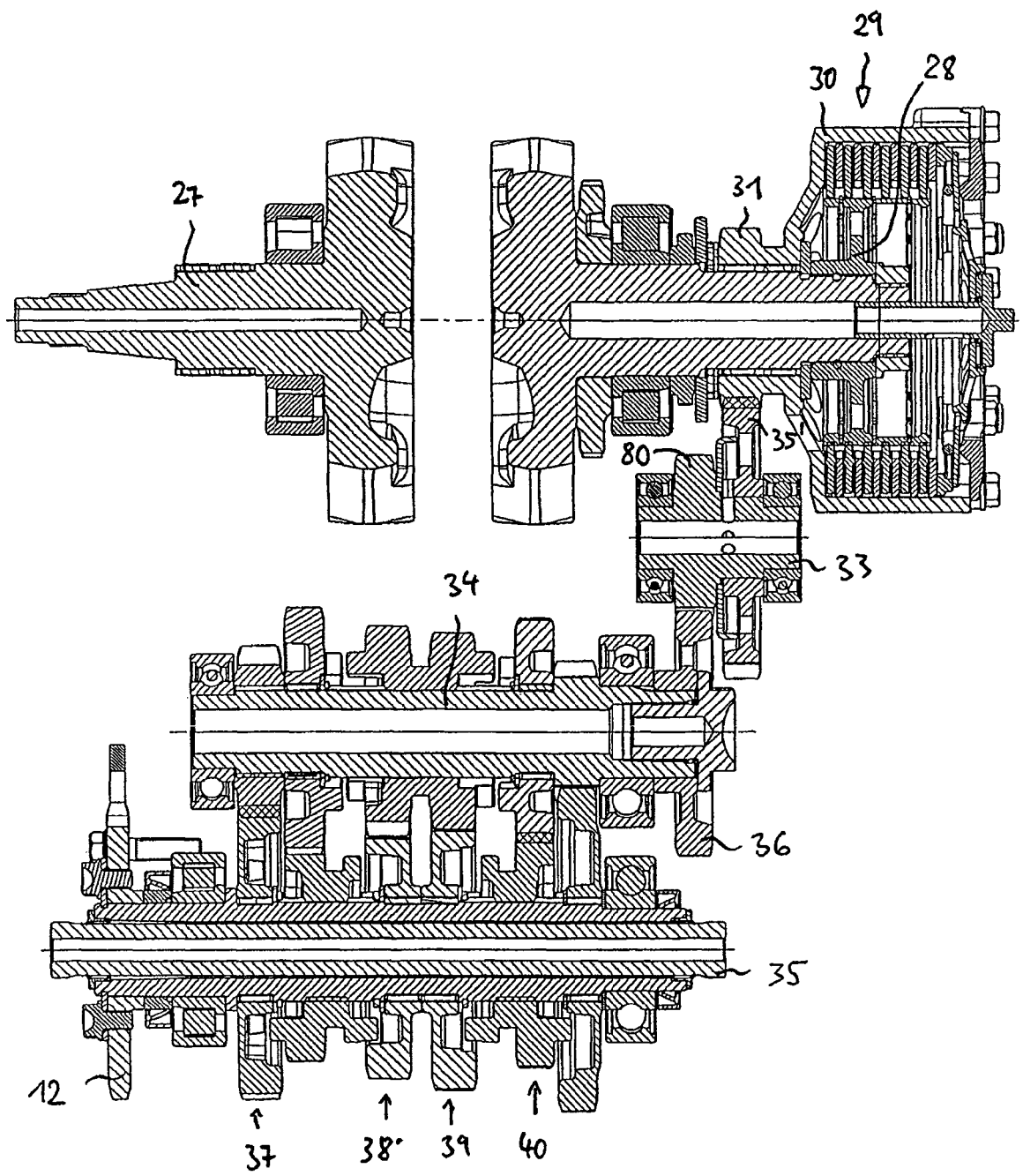
FIG. 15 shows a sectional illustration of an engine/transmission unit according to an embodiment of the present invention.

FIG. 15 shows a section through the entire engine/transmission unit similar to that of FIG. 4, but having the clutch configuration described in FIGS. 10 through 14. With closed lamellar clutch 29, the torque is transmitted from the crankshaft 27 to the internal part 28 and via the lamellar assembly to the clutch basket 30 and the primary pinion 31 connected thereto. The primary pinion 31 engages with the intermediate wheel 35', which is connected rotationally fixed to a gearwheel 80. The gearwheel 80 is in turn connected in one piece to the intermediate shaft 33. The gearwheel 80 engages with the transmission input pinion 36, which is situated on the transmission input 34, from which the torque is transmitted via one of the gearwheel stages 37-40 to the transmission output shaft 35 and/or the transmission output pinion 12.

FIG. 16 through 19 show details of the intermediate drive 81. The intermediate drive 81 is essentially formed by the intermediate wheel 35' engaging with the primary pinion 31 and the gearwheel 80 connected in one piece to the intermediate shaft 33. The intermediate wheel 35' is pressed onto the intermediate shaft 33 and additionally welded thereto. A sheet-metal pot 82 is inserted between the gearwheel 80 and the intermediate wheel 35', which is used for oil separation. A cavity 83 is implemented between the sheet metal pot 82 and the wheel 35', which is fluidly connected via radial holes 84 to a cylindrical recess or hole 85 provided in the intermediate shaft 33. The cylindrical recess 85 is in turn fluidly connected to a ventilation channel 87 provided in the transmission housing 86, which is used for engine ventilation.

Air admixed with engine oil penetrates into the cavity 83. The engine oil distributed dispersed in the air is separated using the sheet-metal pot 82. The exhaust gases may be exhausted outward from the cavity 83 via the radial holes 84 into the cylindrical recess 85 and from there via the ventilation channel 87 outward from the engine and/or transmission housing 86 to the outside.

The foregoing disclosure has been set forth merely to illustrate the invention and is not intended to be limiting. Since modification of the disclosed embodiments incorporating the spirit and substance of the invention may occur to persons skilled in the art, the invention should be construed to include everything within the scope of the appended claims and equivalents thereof.

What is claimed is:

1. An engine/transmission unit for installation in a vehicle, comprising:
   an engine having a crankshaft, the engine being configured such that when installed in the vehicle the crankshaft extends transversely to a longitudinal direction of the vehicle;
   a transmission having
      a transmission input pinion fixed to a transmission input shaft, the transmission input shaft being arranged parallel to and spaced apart from the crankshaft and located in the longitudinal direction behind the crankshaft, and
      a transmission output shaft configured to deliver torque to a vehicle drive element located outside of a housing containing the transmission that is directly coupled to the transmission output shaft, the transmission output shaft being arranged parallel to and spaced apart from the transmission input shaft and located in the longitudinal direction behind the transmission input shaft;
   a clutch having an open state and a closed state, the clutch allowing transmission of torque from the crankshaft to the transmission in the closed state,
   wherein
      the clutch is situated coaxially on the crankshaft,
      a drive element of the clutch is connected rotationally fixed to the crankshaft and an output element of the clutch is rotatable in relation to the crankshaft,
      the output element of the clutch is a clutch basket in which lamellae are suspended radially between the clutch basket and the drive element of the clutch, and the output element of the clutch mechanically engages or is integrally formed with a primary pinion rotatably mounted on the crankshaft,
      the primary pinion engages with an intermediate drive formed by an intermediate wheel situated on an intermediate shaft parallel to and spaced apart from the crankshaft and located in the longitudinal direction behind the crankshaft,
      the intermediate wheel includes a gearwheel rotationally and axially fixed on the intermediate shaft, and
      the transmission input pinion of the transmission input shaft is constantly engaged with the gearwheel of the intermediate drive and offset from the crankshaft.

2. A vehicle, comprising:
an engine having a crankshaft extending transversely to a longitudinal direction of the vehicle;
a transmission having
- a transmission input pinion fixed to a transmission input shaft, the transmission input shaft being arranged parallel to and spaced apart from the crankshaft and located in the longitudinal direction behind the crankshaft, and
- a transmission output shaft configured to deliver torque to a vehicle drive element located outside of a housing containing the transmission that is directly coupled to the transmission output shaft, the transmission output shaft being arranged parallel to and spaced apart from the transmission input shaft and located in the longitudinal direction behind the transmission input shaft;

a clutch having an open state and a closed state, the clutch allowing transmission of torque from the crankshaft to the transmission in the closed state,
wherein
- the clutch is situated coaxially on the crankshaft,
- a drive element of the clutch is connected rotationally fixed to the crankshaft and an output element of the clutch is rotatable in relation to the crankshaft,
- the output element of the clutch is a clutch basket in which lamellae are suspended radially between the clutch basket and, the drive element of the clutch and the output element of the clutch mechanically engages or is integrally formed with a primary pinion rotatably mounted on the crankshaft,
- the primary pinion engages with an intermediate drive formed by an intermediate wheel situated on an intermediate shaft parallel to and spaced apart from the crankshaft and located in the longitudinal direction behind the crankshaft,
- the intermediate wheel includes a gearwheel rotationally and axially fixed on the intermediate shaft, and
- the transmission input pinion of the transmission input shaft is constantly engaged with the gearwheel of the intermediate drive.

3. The vehicle according to claim 2, wherein the output element is supported in an axial direction parallel to a longitudinal direction of the crankshaft on a housing of the engine via a bearing.

4. The vehicle according to claim 2, wherein
the drive element is a clutch internal part, to which the lamellae suspended radially inward are connected in a rotationally fixed manner, and
the lamellae suspended radially outward are rotationally fixed to the clutch basket.

5. The vehicle according to claim 4, wherein the clutch basket is supported via the primary pinion and a bearing on a housing of the engine in an axial direction coaxially to a longitudinal direction of the crankshaft.

6. The vehicle according to claim 5, wherein the clutch basket has a cover element, at least one disk spring supported on the cover element in the axial direction, the at least one disk spring having a radial external area which, when clutch is closed, exerts a closing force on the lamellar essentially formed by the lamellae supported radially inward and radially outward.

7. The vehicle according to claim 6, wherein a disengaging element is provided for opening the clutch, the disengaging element being displaceable in the axial direction and pressing against a radial internal area of the at least one disk spring.

8. The vehicle according to claim 7, wherein a slave piston displaceable in the axial direction is provided for actuating the disengaging element, the slave piston is displaceably situated in a slave cylinder, the slave cylinder being provided in a housing cover element overlapping the clutch, and the slave cylinder has a peripheral grooved recess into which a seal is located, enclosing an exterior side of the slave piston.

9. The vehicle according to claim 8, wherein the housing cover element is flanged onto the housing of the engine.

10. The vehicle according to claim 2, wherein the intermediate wheel is rotationally coupled to a gearwheel of the transmission input shaft situated offset in relation to the intermediate shaft in a direction of a rear wheel swing arm of the vehicle.

11. The vehicle according to claim 10, wherein multiple shiftable gearwheel stages which are engaged with one another are situated on the transmission input shaft (34) and on the transmission output shaft.

12. The vehicle according to one of claim 11, further comprising:
a frame, wherein
the rear wheel swing arm situated so the rear wheel swing arm is pivotable in relation to the frame on a swing arm axis;
the transmission has a transmission housing from which the transmission output shaft projects, the vehicle drive element is situated on the transmission output shaft coupled via a traction mechanism to a chain wheel situated in a rear wheel area of the vehicle, and
the vehicle drive element is situated coaxially to the swing arm axis.

13. The vehicle according to claim 12, wherein the transmission output shaft is a hollow shaft, and the swing arm pivots about the swing arm axis extending through the transmission output shaft.

14. The vehicle according to claim 13, wherein the swing arm pivots on mounts which are pivotable on the frame.

15. The vehicle according to claim 12, wherein the frame has at least two intersecting left frame tubes and at least two intersecting right frame tubes, and the swing arm axis extends through an intersection point of the left frame tubes and through an intersection point of the right frame tubes.

* * * * *